United States Patent [19]

Palmer

[11] 4,414,046
[45] Nov. 8, 1983

[54] FRICTION WELDING

[75] Inventor: Bertram J. Palmer, Staffordshire, England

[73] Assignee: GKN Transmissions Limited, West Midlands, England

[21] Appl. No.: 351,014

[22] Filed: Feb. 22, 1982

[30] Foreign Application Priority Data

Feb. 26, 1981 [GB] United Kingdom ................ 8106087

[51] Int. Cl.³ ...................... B23K 19/02; B29C 27/08
[52] U.S. Cl. .................................. 156/73.5; 156/580; 228/2; 228/113
[58] Field of Search .................. 156/73.5, 580; 228/2, 228/112, 113

[56] References Cited

U.S. PATENT DOCUMENTS 3,691,622  9/1972  Takagi et al. ...................... 156/73.5
3,749,298  7/1973  Hasui .................................. 156/73.5
3,800,995  4/1974  Franks et al. ...................... 156/73.5

FOREIGN PATENT DOCUMENTS 1445696  12/1965  France .
1224360  3/1971  United Kingdom .

Primary Examiner—Michael G. Wityshyn
Attorney, Agent, or Firm—Merriam, Marshall & Bicknell

[57] ABSTRACT

A method of, and apparatus for, friction welding two components such as universal joint members to the ends of a shaft, wherein the shaft is held stationary while the components are rotated against its ends to produce welding conditions, and then released as welding pressure is applied while the components are braked. Allowing the shaft to rotate with the end component during formation of the welds avoids weld quality problems occurring due to the formation and tearing apart of a succession of welds during the time which would be taken for the end components to come to rest if the shaft were held stationary.

4 Claims, 1 Drawing Figure

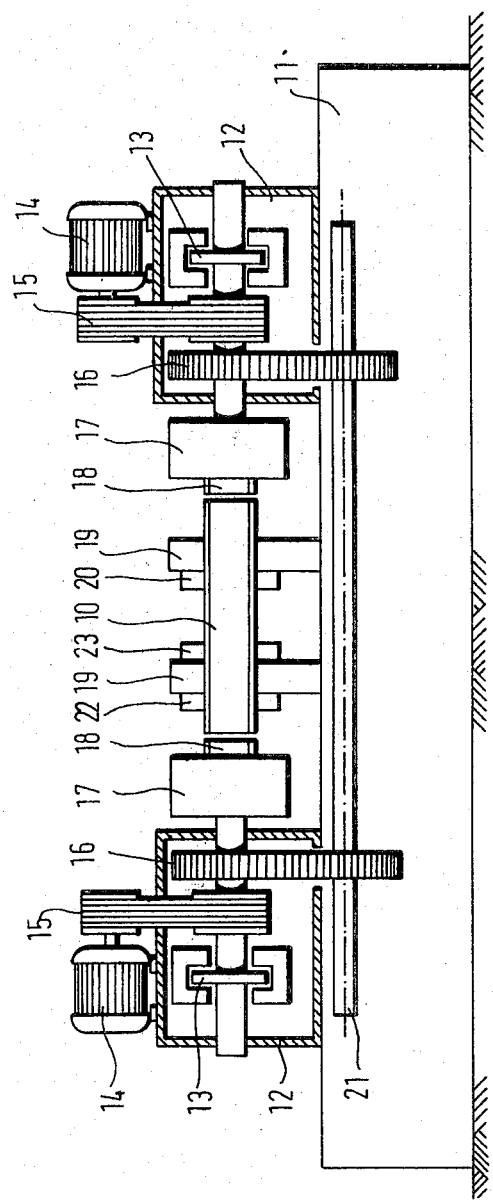

FRICTION WELDING

BACKGROUND TO THE INVENTION

Field of the Invention

This invention relates to a method of, and apparatus for, friction welding. The invention has been developed in relation to the welding of universal joint components to the ends of a shaft, the resulting assembly being intended for use in a motor vehicle.

If such an assembly is to be manufactured by friction welding the universal joint components to the ends of the shaft, apparatus may be used which comprises a holder for holding the shaft stationary and two chucks for holding the joint components at the ends thereof. The joint components are rotated rapidly in contact with the shaft until the material has reached an appropriate welding temperature, and the chucks are braked and a greater axial pressure applied to form the finished welds. Because of the inertia of the chucks holding the joint components, and their associated drive motors and brakes, they cannot be braked to a standstill instantaneously and the practical result of this is that during the application of welding pressure a succession of welds are, in effect, made and then torn apart. Only when all relative rotation has ceased does a final weld result. The result of this is a danger of unsatisfactory welds. The problem is particularly severe in the case of shaft assemblies made of aluminium alloys where the high thermal conductivity of the material gives rise to rapid cooling of the weld regions. The time in which a satisfactory weld can be established is reduced to a minimum.

It has been proposed, in British Patent No. 1,376,071, that when two components are being friction welded together, it can be helpful to enable both components to rotate during the welding phase of the process so that their speeds can synchronize more rapidly than if one component were held stationary throughout. However, the apparatus proposed is relatively complex.

It is the object of the present invention to overcome or reduce these disadvantages.

SUMMARY OF THE INVENTION

According to one aspect of the invention, we provide a method of friction welding first and second components to respective ends of a third component, comprising holding the third component stationary, holding the first and second components at the ends thereof and rotating said first and second components in contact with said third component to produce welding conditions at the junctions therebetween, applying axial welding force to said first and second components to produce welds with said third component, and releasing said third component simultaneously with or immediately after commencement of application said axial force to permit said third component to rotate with said first and second components during production of said welds.

In most cases, the inertia of the third component will be much less than that of the chucks holding the first and second components and their associated equipment. Thus the third component can be accelerated on its release, to rotate at the same speed as the first and second components and permit sound welds to be formed, quicker than the first and second components can be braked to a standstill during the welding process. However, it would clearly be an advantage for the first and second components to be braked as the third component is released, so that uniform rotation of the assembly is achieved as quickly as possible.

The third component may be supported, during application of said welding force, solely by being held between the first and second components. The welding forces applied between it and the first and it and the second components must then be identical.

Alternatively, the third component may be supported by a bearing or bearings, and a thrust bearing may be provided to resist axial displacement of the third component.

The invention also provides apparatus for carrying out the method above set forth.

BRIEF DESCRIPTION OF THE DRAWING

The attached figure of the drawing is a diagrammatic representation of a friction welding machine according to the invention.

DESCRIPTION OF PREFERRED EMBODIMENT

The invention will now be described by way of example with reference to the accompanying drawing, which is a diagrammatic representation of a friction welding machine.

The illustrated machine comprises a bed 11 having two housings 12 mounted at its end. Each housing 12 supports a spindle carrying a chuck 17, a disc brake and calliper assembly 13 for braking the spindle, and a motor 14 for driving the spindle through a belt 15. Motion of the two spindles is synchronised by gears 16 and a lay shaft 21. Between the housings 12, the bed of the machine carries clamps 19 for holding stationary a tubular shaft component 10.

If the components required to be welded to the ends of the shaft component 10 are, for example, Hookes universal joint yokes, they need to be in a particular alignment relative to one another. The lay shaft 21 permits such alignment to be maintained.

In use of the machine, the universal joint components 18 which are required to be welded to the ends of the shaft 10 are held in the chucks 17. By means not shown, as is well known in friction welding machines, the joint components 18 are urged into abutment with the ends of tube 10 and the two spindles of the machine driven in synchronism with one another to establish welding temperatures at the junctions between the joint components and the shaft. The brakes 13 are then applied and a relatively greater force applied to both the components 18 to form the welds with the shaft.

The invention provides that the control system of the machine operates to release the tube 10 simultaneously with or immediately after the commencement of the application of the welding force to the components 18. Because it takes a finite time, resulting from the inertia of the chucks, spindles, synchronising gears and lay shaft, motors and brakes, for the components 18 to come to rest, releasing the tube 10 permits it to accelerate and rotate with the components 18 during welding. It is believed that this will produce better welds than if the shaft were not released.

The clamps 19 may completely release the tube 10, so that during welding it is supported solely by engagement with the components 18. Alternatively, the tube 10 may be held in a lightweight chuck or collet 20, 23 rotatably mounted in bearings associated with the clamps 19. A thrust bearing 22 may be provided. It would then be possible, if desired, to apply different welding forces at opposite ends of the tube 10 if, for example, the components 18 are not identical and hence different welding conditions are required.

I claim:

1. A method of friction welding first and second components to respective ends of a third component, comprising holding said third component stationary, holding said first and second components at the ends of said third component, applying axial force thereto and rotating them in contact with said third component to produce welding conditions at the junctions therebetween, applying further axial force to said first and second components to produce welds with said third component, and braking said first and second components and releasing said third component substantially simultaneously with commencement of application of said axial force, to permit said third component to rotate and be braked with said first and second components during production of said welds.

2. A method of friction welding first and second components to respective ends of a third component, comprising holding said third component stationary, holding said first and second components at the ends of said third component, applying axial force thereto and rotating them in contact with said third component to produce welding conditions at the junctions therebetween, applying further axial force to said first and second components to produce welds with said third component, and braking said first and second components and releasing said third component substantially simultaneously with or immediately after commencement of application of said axial force, to permit said third component to rotate and be braked with said first and second components during production of said welds, with said third component being supported, during application of said welding force, solely by being held between said first and second components.

3. Apparatus for friction welding first and second components to respective ends of a third component, comprising releasable means for holding said third component stationary, means for holding said first and second components, means for driving said first and second components to rotate same, means for applying axially directed force to said first and second components while rotating to urge them into position with said third component and to apply a force thereto sufficient to cause welding of said components, means for braking said first and second components, and control means operable to cause release of said third component, by said holding means therefor, substantially simultaneously with operation of said means for braking and first and second components.

4. Apparatus according to claim 3 wherein said means for holding said third component comprises bearing means for supporting said component for rotation, and releasable braking means operable selectively to prevent or permit said rotation.

* * * * *